United States Patent [19]

Krohn et al.

[11] 4,042,405

[45] Aug. 16, 1977

[54] HIGH STRENGTH OPHTHALMIC LENS

[75] Inventors: David A. Krohn; Robert E. Graf, both of Southbridge, Mass.; Emil W. Deeg, Woodstock, Conn.

[73] Assignee: American Optical Corporation, Southbridge, Mass.

[21] Appl. No.: 668,174

[22] Filed: Mar. 18, 1976

[51] Int. Cl.² .................. C03C 21/00; C03C 3/04; C03C 3/30

[52] U.S. Cl. .................. 106/52; 106/47 Q; 351/166

[58] Field of Search .................. 106/472, 52; 65/30 E; 351/166

[56] References Cited

U.S. PATENT DOCUMENTS

| | | | |
|---|---|---|---|
| 3,433,611 | 3/1969 | Saunders et al. | 65/30 E |
| 3,441,398 | 4/1969 | Hess | 65/30 E |
| 3,485,647 | 12/1969 | Harrington | 65/30 E |
| 3,533,888 | 10/1970 | Eppler et al. | 351/166 |
| 3,790,260 | 2/1974 | Boyd et al. | 351/166 |

*Primary Examiner*—Winston A. Douglas
*Assistant Examiner*—Mark Bell
*Attorney, Agent, or Firm*—William C. Nealon; H. R. Berkenstock, Jr.

[57] ABSTRACT

An ophthalmic glass lens having a compressively-stressed surface zone after ion exchanging which is at least 120 microns in depth, formed from an alkali metal oxide silicate glass comprising by weight about 4 to about 15 percent sodium oxide and about 3 to about 15 percent potassium oxide. There is a compressively-stressed surface layer having a strength of at least 25,000 psi. The total amount of sodium, potassium and other alkali metal oxides is up to about 20 percent. The total amount of zinc oxide, lanthanum oxide, magnesium oxide, and calcium oxide is about 8 to 15 percent, and there is about 3 to about 15 percent phosphorus pentoxide. An ion exchange process takes place at a temperature either above or below the strain point of conventional ophthalmic crown glass to produce satisfactory physical properties in the ophthalmic glass lens.

3 Claims, No Drawings

HIGH STRENGTH OPHTHALMIC LENS

BACKGROUND OF THE INVENTION

1. Field of the Invention

This invention is in the field of chemical or ion exchange treatment of a silicate glass ophthalmic lens to develop strength by compressively stressing a surface layer of the glass. Potassium ions are introduced into the surface layer in exchange for sodium ions during the ion exchange treatment.

2. Description of the Prior Art

It is known that glass containing sodium ions can be strengthened by having contact with a molten salt containing alkali metal ions with a diameter greater than that of sodium ions in the glass. Where potassium ions are substituted for the sodium ions, a compressive stress is developed in the surface layer of the glass article as disclosed in the *Journal of the American Ceramic Society*, Vol. 45, No. 2 (February 1962) pages 59–68. In the process described in the above article, ion exchange was conducted at a temperature below the strain point of the glass so as to inhibit molecular re-arrangement and viscous flow during ion exchange of the monovalent metal ions migrating into the glass surface. The larger ions from the molten salt in effect are squeezed into sites originally occupied by the smaller alkali metal ions. The compressive stress set up by this crowding effect substantially increases the impact strength of the glass.

In an article entitled "Strengthening by Ion Exchange" in the *Journal of the American Ceramic Society*, Vol. 47, No. 5, May 1964, pages 215–219, glasses are described which contain substantial amounts of aluminum oxide or zirconium oxide. These glasses are said to be uniquely capable of having strength imparted thereto by an ion exchange process conducted below the strain point of the glass. Such glasses also maintain high strength subsequent to being abraded to simulate ordinary usage.

In application Ser. No. 390,742, entitled "hardened Ophthalmic Lenses and Method of Making Same", abandoned in favor of Ser. No. 541,834, filed Jan. 17, 1975 and Ser. No. 611,383, filed Sept. 8, 1975, and assigned to the assignees of the instant invention, a process is disclosed for treating an alkali metal silicate ophthalmic glass by an ion exchange process utilizing a molten bath of potassium nitrate at a temperature ranging from 400° C to 516° C. This latter temperature range is above the strain point of most ophthalmic glasses but is well below the softening point of the glass. The process has the advantage that a shorter ion exchange period is thereby made feasible.

Comparative results obtained in high temperature and low temperature ion exchange processes conducted over the same time interval indicate that the low temperature ion exchange process, that is, one conducted at a temperature below the strain point of the glass results in a glass having a stressed surface layer which is normally relatively shallow and in order to obtain deeper penetration, longer treatment times are required. In the high temperature ion exchange process, that is, one using temperatures above the strain point of the glass, a stressed layer is obtained which is normally relatively deep in comparison to the stressed layers obtained by the low temperature ion exchange process. Presumably because molecular re-arrangement can take place, lower compressive stresses are generally obtained in the stressed layer of the glass.

U.S. Pat. No. 3,790,260 discusses the importance of depth of penetration of a compressively-stressed surface layer, or neutral zone, as a means of providing a satisfactory ophthalmic lens with resistance to lens breakage even after abrasion in use. The recommended depth of compression is about 100 microns or greater. Typically, the ophthalmic lens industry has employed soda-lime-silica glasses for the production of ophthalmic lenses in which this depth of compression is generally less than 60 microns. Thus, it is desirable to develop a reliable method of deepening the compressively-stressed surface layer obtained by ion exchange strengthening of an ophthalmic lens. By the present invention, an ophthalmic lens of superior strength is obtained utilizing a temperature either above or below the glass strain point.

It is also desirable to provide a compressive stress value at the surface of an ophthalmic glass lens of at least about 15,000 psi. The present invention fulfills this need and has provided various other advantages as will become apparent from the following detailed description of the invention.

SUMMARY OF THE INVENTION

Conventional silicate-based ophthalmic-quality crown glass lenses suitable for ion exchange strengthening contain, in addition to alkali metal oxides such as sodium and potassium oxides, metal oxides such as zinc oxide, calcium oxide, magnesium oxide, and titanium dioxide as well as trivalent metallic oxides such as aluminum and boron oxides. It has now been discovered that phosphorus pentoxide can be used to replace part of the silica as well as part of, or possible all of, the divalent metal oxides in the preparation of an ophthalmic-quality silicate-based glass lens. The lens is especially suitable for further processing to improve surface compression and depth of penetration as compared to conventional ophthalmic-quality crown glass.

The chemical, or ion exchange, process of the invention can be conducted at a temperature either above or below the strain point of conventional ophthalmic crown glass. It has been found that phosphorus pentoxide in such glasses promotes rapid attainment of satisfactory depth of the compressively-stressed ion-exchanged layer when used as a partial replacement for silica.

DESCRIPTION OF THE PREFERRED EMBODIMENTS

Traditionally, the ophthalmic glass lens industry has employed modified soda-lime-silica glasses for the production of ophthalmic lenses. In general, the soda-lime-silica glasses of the prior art contain 55–75 percent silicon dioxide, 15–20 percent of a combination of sodium oxide and potassium oxide, and 8–15 percent lime with up to 2 percent aluminum oxide together with the usual minor amounts of fining agents and colorants as required. Use of divalent metal oxides other than lime such as zinc or titanium dioxide for the purpose of adjusting the refractive index is known. In addition, zinc oxide has been used instead of calcium oxide to increase the ion exchangeability of the glass (U.S. Pat. No. 3,790,260).

The compositions of the present invention provide an ophthalmic-quality glass suitable for making a high strength ophthalmic lens by chemical, or ion exchange, subsequent to conventional casting, grinding, polishing, and edging a lens blank. Phosphorus pentoxide is utilized in the glass composition and this enhance further treatment by chemical, or ion exchange, processes.

Chemically, or ion-exchanged, glass ophthalmic-quality lenses made using the glass compositions of this invention can be strengthened so the depth of the ion-exchanged surface zone (measured as the depth of the neutral zone) is at least about 120 to about 160 micrometers in depth. It is believed that for adequate retention of strength the neutral zone must be at least 60 micrometers in depth, and preferably 100 micrometers or more in order to retain strength under the abrasive conditions experienced in normal use by the wearer. According to the present invention, there is provided a lens having at least about 120 micron depth of penetration.

It is known that a lens blank capable of withstanding the impact of a ⅝ inch steel ball dropped from a distance of 200 inches onto the convex surface of the lens can be prepared by an ion-exchange process conducted either (1) at a temperature above the strain point of the glass as further described in application Ser. No. 390,742, filed Aug. 23, 1973, and abandoned in favor of Ser. No. 541,834, filed Jan. 17, 1975 and Ser. No. 611,383, filed Sept. 8, 1975, or (2) at a temperature below the strain point of the glass as is further described in U.S. Pat. No. 3,790,260 and the disclosure of these processes in these patent documents are hereby incorporated by reference.

It is believed that of the two parameters, depth of penetration and compressive strength at the surface, the attainment of sufficient depth of penetration of the compressively-stressed layer is the more important, so long as a surface compression of at least about 15,000 psi is achieved. According to the present invention, at least about 25,000 psi of surface compression is attained.

In essence, a broad stress profile is desired. Under conditions of actual use, where the compressively-stressed layer is relatively shallow, minute scratches can penetrate the compressively-stressed surface layer and thereby weaken the glass sufficiently so it no longer exhibits the high strength resulting from the ion-exchanging treatment.

The ion-exchange treatment at a temperature below the strain point of ophthalmic crown glass, described in U.S. Pat. No. 3,790,260, involves exchange at temperatures from 20° to 120° C below the strain point but at a temperature of at least about 350°C. A normal treatment in molten potassium nitrate may be for a period of 16 hours at a temperature of about 450°C.

In general, ophthalmic crown glass is required to have a refractive index in the range of about 1.515 to about 1.530. The accepted industry standard for refractive index is presently 1.523. The glass of the invention has a refractive index within the above range.

Generally, glass compositions of the present invention can contain the following proportions of ingredients in percent by weight (to an oxide basis):

TABLE I

| Ingredient | Percent by Weight |
| --- | --- |
| sodium oxide | about 4 to about 15 |
| potassium oxide | about 3 to about 15 |
| Other Alkali Metal Oxides: | |
| lithium oxide | up to about 5 |
| rubidium oxide | up to about 5 |
| cesium oxide | up to about 5 |
| lanthanum oxide | up to about 15 |
| aluminum oxide | up to about 5 |
| zirconium oxide | up to about 5 |
| zinc oxide | up to about 15 |
| calcium oxide | up to about 10 |
| titanium oxide | up to about 5 |
| magnesium oxide | up to about 4 |
| boron oxide | up to about 2 |
| phosphorus pentoxide | about 3 to about 15 |

TABLE I-continued

| Ingredient | Percent by Weight |
| --- | --- |
| Total $Na_2O$ + $K_2O$ and other alkali metal oxides | about 12 to about 20 |
| Total ZnO + $La_2O_3$ + CaO + MgO | about 8 to about 15 |
| Total MgO + $Al_2O_3$ | about 0.2 to about 5 |
| Fining Agents (antimony oxide, cerium oxide, arsenic oxide and mixtures thereof) | up to about 2 |
| silica | balance |

Preferred embodiments of glass according to the invention are within the weight compositional limits indicated below (by weight, on an oxide basis):

TABLE II

| Ingredient | Percent by Weight |
| --- | --- |
| sodium oxide | about 7 to about 10 |
| potassium oxide | about 7 to about 11 |
| zinc oxide | up to about 15 |
| aluminum oxide | about 0.2 to about 4 |
| phosphorus pentoxide | about 3 to about 15 |
| lanthanum oxide | up to about 15 |
| calcium oxide | up to about 10 |
| titanium oxide | up to about 5 |
| magnesium oxide | up to about 4 |
| Total ZnO + CaO + $La_2O_3$ + MgO | about 8 to about 15 |
| Fining Agents (antimony oxide, cerium oxide, arsenic oxide and mixtures thereof) | up to about 2 |
| silica | balance |

If insufficient silicon dioxide is present, this will promote devitrification and make forming of ophthalmic lenses difficult. On the other hand, a silicon dioxide content which is too high, causes the glass to become hard with attendant difficulty in melting and forming. Therefore, for the present invention, the silicon dioxide content should be in the range of about 45 to about 70 percent by weight.

Aluminum oxide traditionally has been used either alone or in combination with zirconium oxide in glass which is to be ion exchanged since the degree of strengthening attainable has been found to be considerably enhanced in the resence of substantial amounts of these oxides. For instance, in U.S. Pat. No. 3,533,888, there is disclosed that when 5-25 percent aluminum and/or zirconium oxide is present in a glass, it is particularly suitable for chemical, or ion exchange, treatment. Aluminum oxide need not be included to enhance ion exchange strengthening but it is desirably utilized in glass compositions according to this invention in amounts of about 0.2 percent to about 4 percent by weight to provide satisfactory glass durability: that is, resistance to erosion under the influence of moisture, acids, and alkalies.

Zinc oxide, calcium oxide, and magnesium oxide, traditionally have been used in glass to be ion exchanged in separate amounts exceeding 1 percent by weight to improve melting properties of the glass and provide a glass exhibiting a viscosity curve indicating it is especially suitable for glass forming. It is generally desired that the combined total of zinc oxide, calcium oxide, lanthanum oxide, and magnesium oxide in glass compositions, according to the present invention, be present in an amount up to about 15 percent by weight on an oxide basis. While zinc oxide has been found superior to the other divalent ions listed above in promoting ion exchange, it also has been found that in compositions according to the present invention it is not necessary to utilize any of these divalent ions to improve either melting properties or increase ion exchange rate. In accordance with application Ser. No. 592,703 filed July 2, 1975, lanthanum oxide has been found to be a satisfactory substitute therefore. It not only acts to improve the melting property of the glass but also provides an increase in ion exchange rate.

Boron oxide is also known to be helpful in controlling the viscosity curve of glass without causing an excessive rise in liquidus temperature. In ophthalmic lens compositions according to the present invention, boron oxide can be utilized as an optional ingredient but its presence in the glass is not required.

In carrying out chemical, or ion exchange, processes with a potassium salt, a typically used salt such as potassium nitrate can be replaced by potassium sulfate or a mixture thereof with potassium nitrate. Satisfactory results can also be obtained by applying a paste consisting of a mixture of an inert solid material such as clay and a potassium salt to the surface of the glass article and then heating the glass article.

One disadvantage of prior art ion-exchange processes, when conducted at a temperature below the strain temperature of the glass, is that a relatively shallow compressively-stressed layer is produced and, therefore, unless the ion-exchange treatment is carried on for a considerable time period, for example 16 hours or more, to obtain sufficient depth, or thickness, in the ion-exchanged surface layer, the advantages of the process can be completely lost upon subjection of the ion-exchanged surface to even mild abrasive influences such as inevitably occur during normal use. The following examples illustrate various aspects of the present invention but are not intended to limit it. Where not otherwise specified throughout the specification and claims, temperatures are given in degrees Centigrade and parts are by weight.

The glasses disclosed in this invention were made in platinum crucibles using standard glass-making techniques. Raw materials consisted of high-purity silica, aluminum hydroxide, magnesium oxide, nitrates and carbonates of sodium and potassium, titania, zinc oxide, phosphorus pentoxide, boric acid, arsenic, antimony oxides, and so forth. The batch components were thoroughly mixed prior to melting. In preparing the glasses, a platinum crucible with a 0.5 liter capacity was preheated at 1425° C in an electric furnace. A batch was then transferred to the crucible in 50 in gram portions. After the crucible was sufficiently full, the temperature was raised to 1480° C for 7 hours. The glass was subsequently cast into a sheet at that temperature, transferred to an annealing furnace and annealed according to the following procedure:

The glass was held at a temperature in the range of about 580° C for about 1 hour and then cooled at a rate of about 15° C to about 50° C per hour until the glass was at room temperature. Plates were then cut from this glass and subjected to an ion-exchange treatment in a potassium nitrate bath for 6 hours at 510° C or 16 hours at 454° C. The former temperature is above the strain point of most ophthalmic crown glasses and the latter temperature is below the strain point of said glasses. Photoelastic analysis was accomplished using the following methods: The surface compression was measured in strips of glass cut from said plates using a polarizing microscope equipped with a quartz wedge compensator. The depth of the compressive layer was measured using a polarizing microscope in a Freidel configuration together with a filar eyepiece.

EXAMPLE I

A glass according to U.S. Pat. No. 3,790,260, having the analysis shown in Table III, was prepared in the manner just described and ion-exchange treated for 16 hours at the temperature conditions shown in Table V. This example is for control and represents no part of this invention. It is representative of that claimed in U.S. Pat. No. 3,790,260.

EXAMPLES 2–6

Samples of the glasses shown in Table III were prepared by melting silica sand, salts of sodium and potassium, phosphorus pentoxide, as listed in the proportions shown in Table I in a platinum crucible, as described above. After the resulting cast sheet was annealed according to the above procedure, plates which were cut from the sheet were evaluated for physical properties which are shown in Table IV and then ion exchanged using (above the strain point of conventional ophthalmic glass for 6 hours or at a temperature below said strain point for 16 hours) temperature conditions as shown in Table III below.

TABLE III

GLASS COMPOSITIONS FOR ION EXCHANGE

| Ingredients | (control) Example 1 | Example 2 | Example 3 | *Example 4 | Example 5 | Example 6 |
|---|---|---|---|---|---|---|
| $SiO_2$ | 61.85 | 56.85 | 51.85 | 47.85 | 54.35 | 59.90 |
| $Al_2O_3$ | 2.50 | 2.50 | 2.50 | 6.50 | 0.00 | 0.00 |
| MgO | 3.25 | 3.25 | 3.25 | 3.25 | 3.25 | 0.00 |
| $Na_2O$ | 8.77 | 8.77 | 8.77 | 8.77 | 8.77 | 8.77 |
| $K_2O$ | 9.93 | 9.93 | 9.93 | 9.93 | 9.93 | 9.93 |
| $TiO_2$ | 1.20 | 1.20 | 1.20 | 1.20 | 1.20 | 0.00 |
| ZnO | 10.90 | 10.90 | 10.90 | 10.90 | 10.90 | 10.90 |
| $B_2O_3$ | 1.10 | 1.10 | 1.10 | 1.10 | 1.10 | 0.00 |
| $As_2O_3$ | 0.25 | 0.25 | 0.25 | 0.25 | 0.25 | 0.25 |
| $Sb_2O_3$ | 0.25 | 0.25 | 0.25 | 0.25 | 0.25 | 0.25 |
| $P_2O_5$ | 0.00 | 5.00 | 10.00 | 10.00 | 10.00 | 10.00 |

*This is the preferred embodiment of the invention and represents the best mode now known for the practice of the invention.

TABLE IV

PHYSICAL PROPERTIES OF GLASSES FOR ION EXCHANGE (PRIOR TO ION EXCHANGING)

| Physical Property | (control) Example 1 | Example 2 | Example 3 | Example 4 | Example 5 | Example 6 |
|---|---|---|---|---|---|---|
| Index ($n_D$) | 1.525 | 1.517 | 1.514 | 1.518 | 1.508 | 1.499 |
| Strain Pt (° C) | 506 | 499 | 502 | 520 | 514 | — |
| Annealing Pt (° C) | 546 | 538 | 553 | 660 | 559 | — |
| Softening Pt (° C) | 733 | 725 | 787 | 816 | 796 | 819 |
| Coef. of Exp. ($10^{-7}$/° C) | — | 98 | 102 | 118 | 100 | 110 |

*This is the preferred embodiment of the invention and represents the best mode now known for the practice of the invention.

TABLE V

STRENGTH OF GLASS COMPOSITIONS AFTER ION EXCHANGE[1]

| Ion Exchange Cycle | (control) Example 1 | Example 2 | Example 3 | *Example 4 | Example 5 | Example 6 |
|---|---|---|---|---|---|---|
| 454° C 16 hrs. | | | | | | |
| Compression (psi) | 56,700 | 28,100 | 37,100 | 46,300 | 38,800 | 34,300 |
| Depth (microns) | 106 | 126 | 132 | 156 | 150 | 121 |
| 510° C 6 hrs. | | | | | | |
| Compression (psi) | 42,900 | 41,000 | 33,900 | 35,900 | — | — |
| Depth (microns) | 111 | 131 | 141 | 150 | — | — |

[1]$KNO_3$ salt bath
*This is the preferred embodiment of the invention and represents the best mode now known for the practice of the invention.

As can be seen by a study of the Tables, Example 4 is the preferred embodiment of the invention. In Example 4 there is shown the inclusion of 10 percent by weight on an oxide basis of $P_2O_5$. It has an index of refraction ($n_D$) of 1.518 and has been ion exchanged at a temperature of about 454° C. It has a compressive strength of 46,300 and is over the 25,000 psi desired according to the present invention and has a depth of penetration of 156 microns.

Having thus described our invention in detail with sufficient particularity as to enable one skilled in the art to practice the invention, what is desired to be protected by letters patent is set forth in the following claims.

What is claimed is:

1. A chemically-strengthened ophthalmic glass lens made from a phospho-silicate glass having the following chemical analysis:

| Ingredient | Percent by Weight |
|---|---|
| sodium oxide | about 4 to about 15 |
| potassium oxide | about 3 to about 15 |
| Other Alkali Metal Oxides: | |
|   lithium oxide | up to about 5 |
|   rubidium oxide | up to about 5 |
|   cesium oxide | up to about 5 |
| lanthanum oxide | up to about 15 |
| aluminum oxide | up to about 5 |
| zirconium oxide | up to about 5 |
| zinc oxide | up to about 15 |
| calcium oxide | up to about 10 |
| titanium oxide | up to about 5 |
| magnesium oxide | up to about 4 |
| boron oxide | up to about 2 |
| phosphorus pentoxide | about 3 to about 15 |
| Total $Na_2O + K_2O$ and other alkali metal oxides | about 12 to about 20 |
| Total $ZnO + La_2O_3 + CaO + MgO$ | about 8 to about 15 |
| Total $MgO + Al_2O_3$ | about 0.2 to about 5 |
| Fining Agents (antimony oxide, cerium oxide, arsenic oxide and mixtures thereof) | up to about 2 |
| silica | balance | said lens characterized by an index of refraction in the range of about 1.50 to 1.52 having a minimum depth of penetration of potassium ions of 120 microns and a compressively-stressed surface layer having a strength of at least 25,000 psi.

2. A chemically-strengthened ophthalmic glass lens according to claim 1 made from a glass containing the following chemical analysis:

| Ingredient | Percent by Weight |
|---|---|
| sodium oxide | about 7 to about 10 |
| potassium oxide | about 7 to about 11 |
| zinc oxide | up to about 15 |
| aluminum oxide | about 0.2 to about 4 |
| phosphorus pentoxide | about 3 to about 15 |
| lanthanum oxide | up to about 15 |
| Calcium oxide | up to about 10 |
| titanium oxide | up to about 5 |
| magnesium oxide | up to about 4 |
| Total $ZnO + CaO + La_2O_3 + MgO$ | about 8 to about 15 |
| Fining Agents (antimony oxide, cerium oxide, arsenic oxide and mixtures thereof) | up to about 2 |
| silica | balance |

3. The lens of claim 1 wherein said glass comprises by weight 8.8 percent sodium oxide, 9.9 percent potassium oxide, 3.3 percent magnesium oxide, 2.5 percent aluminum oxide, 10.9 percent zinc oxide, and about 3 to about 15 percent phosphorus pentoxide.

* * * * *